United States Patent
Delaney et al.

(10) Patent No.: US 10,970,471 B2
(45) Date of Patent: Apr. 6, 2021

(54) PHASED COLLABORATIVE EDITING

(71) Applicant: INTERNATIONAL BUSINESS MACHINES CORPORATION, Armonk, NY (US)

(72) Inventors: Mark Delaney, Raleigh, NC (US); Robert H. Grant, Atlanta, GA (US); Jonathan Dunne, Dungarvan (IE); Charlotte Hutchinson, Surrey (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 212 days.

(21) Appl. No.: 15/959,477

(22) Filed: Apr. 23, 2018

(65) Prior Publication Data
US 2019/0325012 A1 Oct. 24, 2019

(51) Int. Cl.
*G06F 17/24* (2006.01)
*G06F 40/166* (2020.01)
*G06F 40/289* (2020.01)

(52) U.S. Cl.
CPC .......... *G06F 40/166* (2020.01); *G06F 40/289* (2020.01)

(58) Field of Classification Search
CPC .... G06F 17/24; G06F 17/2775; G06F 40/166; G06F 40/289
See application file for complete search history.

(56) References Cited

U.S. PATENT DOCUMENTS

| | | | | |
|---|---|---|---|---|
| 6,035,055 A | * | 3/2000 | Wang | G06F 16/5838 382/118 |
| 6,970,870 B2 | * | 11/2005 | Dweck | G06F 16/353 |
| 7,020,651 B2 | * | 3/2006 | Ripley | G06F 16/2468 |
| 7,044,363 B2 | * | 5/2006 | Silverbrook | B41J 2/17503 235/375 |
| 7,260,568 B2 | * | 8/2007 | Zhang | G06F 16/3334 707/711 |
| 7,389,473 B1 | * | 6/2008 | Sawicki | G06F 17/211 715/255 |
| 7,523,394 B2 | * | 4/2009 | Jones | G06F 17/211 715/236 |
| 7,664,751 B2 | * | 2/2010 | O'Sullivan | G06F 21/6218 707/783 |
| 7,890,549 B2 | * | 2/2011 | Elad | G06Q 30/02 706/11 |
| 7,950,064 B2 | * | 5/2011 | Chavez | G06F 17/241 715/234 |
| 7,991,840 B2 | * | 8/2011 | Boyer | G06F 16/958 709/205 |

(Continued)

OTHER PUBLICATIONS

"Pragmatic Aspects of Grammatical Constructions" by Paul Kay, 2001.*

*Primary Examiner* — Jung-Mu T Chuang
(74) *Attorney, Agent, or Firm* — Griffiths & Seaton PLLC

(57) ABSTRACT

Embodiments for phased collaborative editing by a processor. A region tag of phased input may be assigned to one or more document regions of a collaborative document along with a list of users enabled to input data to the one or more document regions according to the region tag. A concealed region of the one or more document regions may be revealed to one or more users in the list of users upon content input by a user matching content of the concealed region.

20 Claims, 9 Drawing Sheets

(56) References Cited

U.S. PATENT DOCUMENTS

| | | | | |
|---|---|---|---|---|
| 8,024,310 B2* | 9/2011 | Zhong | G06Q 10/10 | 707/705 |
| 8,214,346 B2* | 7/2012 | Pradhan | G06F 16/93 | 707/706 |
| 8,260,859 B2* | 9/2012 | Boyer | G06F 16/958 | 709/205 |
| 8,490,157 B2* | 7/2013 | Thompson | G06F 21/6218 | 726/2 |
| 8,910,243 B2* | 12/2014 | Kang | G06F 21/31 | 726/3 |
| 8,918,717 B2* | 12/2014 | Brooks | G06Q 10/10 | 715/738 |
| 8,943,417 B2* | 1/2015 | Parker | G06F 3/0483 | 715/751 |
| 9,172,669 B2* | 10/2015 | Swink | H04M 1/72555 | |
| 9,176,943 B2 | 11/2015 | Shaver | | |
| 9,268,950 B2* | 2/2016 | Gkoulalas-Divanis | G06F 21/60 | |
| 9,348,808 B2* | 5/2016 | Kurabayashi | G06F 16/90328 | |
| 9,432,327 B2* | 8/2016 | Ahrens | H04W 4/21 | |
| 9,510,156 B2* | 11/2016 | Grossman | G08B 21/18 | |
| 9,547,770 B2* | 1/2017 | Meyer | G06F 21/62 | |
| 9,588,595 B2* | 3/2017 | Demopoulos | G06F 3/0233 | |
| 9,654,447 B2* | 5/2017 | Brock | H04L 63/0263 | |
| 9,727,615 B2* | 8/2017 | Wu | G06Q 30/0283 | |
| 10,057,199 B2* | 8/2018 | Ball | G06F 16/9535 | |
| 10,298,528 B2* | 5/2019 | Chi | H04L 51/16 | |
| 2002/0065848 A1* | 5/2002 | Walker | G06F 40/166 | 715/205 |
| 2003/0011631 A1* | 1/2003 | Halahmi | G06F 16/9577 | 715/744 |
| 2003/0084048 A1* | 5/2003 | Dweck | G06F 16/353 | |
| 2003/0106024 A1* | 6/2003 | Silverbrook | B41J 2/17503 | 715/236 |
| 2004/0210818 A1* | 10/2004 | Jones | G06F 17/211 | 715/236 |
| 2005/0055345 A1* | 3/2005 | Ripley | G06F 16/2462 | |
| 2006/0074913 A1* | 4/2006 | O'Sullivan | G06F 21/6218 | |
| 2008/0229230 A1* | 9/2008 | Grigoriev | G06F 21/82 | 715/780 |
| 2008/0281915 A1* | 11/2008 | Elad | G06Q 10/10 | 709/204 |
| 2008/0319979 A1* | 12/2008 | Zhong | G06Q 10/10 | |
| 2009/0129596 A1* | 5/2009 | Chavez | G06F 17/241 | 380/277 |
| 2010/0030859 A1* | 2/2010 | Huang | G06F 16/9577 | 709/206 |
| 2010/0066983 A1* | 3/2010 | Jun | H04N 9/3147 | 353/79 |
| 2011/0166929 A1* | 7/2011 | Lee | G06Q 30/0251 | 705/14.49 |
| 2011/0213840 A1* | 9/2011 | Boyer | G06F 16/958 | 709/205 |
| 2012/0204222 A1* | 8/2012 | Bodi | H04L 63/20 | 726/1 |
| 2012/0303600 A1* | 11/2012 | Mukhopadhyay | G06F 40/253 | 707/706 |
| 2013/0151508 A1* | 6/2013 | Kurabayashi | G06F 16/90328 | 707/723 |
| 2014/0143030 A1* | 5/2014 | Zeinfeld | G06Q 50/01 | 705/14.1 |
| 2014/0143713 A1* | 5/2014 | Gudorf | G06F 3/0484 | 715/784 |
| 2015/0081687 A1* | 3/2015 | Lee | G06F 16/9535 | 707/723 |
| 2015/0154497 A1* | 6/2015 | Braziunas | G06F 16/93 | 706/12 |
| 2015/0262069 A1* | 9/2015 | Gabriel | G06F 16/9535 | 706/48 |
| 2017/0024374 A1* | 1/2017 | Bastide | G06F 17/24 | |
| 2017/0142044 A1* | 5/2017 | Ball | G06F 16/23 | |
| 2017/0300473 A1* | 10/2017 | Bhattacharya | G06F 17/2725 | |
| 2017/0372142 A1* | 12/2017 | Bilobrov | G06F 16/2228 | |
| 2018/0239752 A1* | 8/2018 | Bhattacharya | G06F 17/2725 | |
| 2019/0020913 A9* | 1/2019 | Bilobrov | G06F 16/907 | |

\* cited by examiner

600

602A — MASTER VIEW IN REAL TIME

|  | USER A | USER B | USER C |
|---|---|---|---|
| EXPERIENCE | 5 |  | 4 |
| SKILLS | 4 |  | 3 |
| PROFESSIONALISM | 3 |  | 1 |
| RELEVANCE | 4 |  | 4 |

602B — USER B'S VIEW PRIOR TO RATING

|  | USER A | USER B | USER C |
|---|---|---|---|
| EXPERIENCE |  |  |  |
| SKILLS |  |  |  |
| PROFESSIONALISM |  |  |  |
| RELEVANCE |  |  |  |

602C — USER B'S VIEW AFTER RATING

|  | USER A | USER B | USER C |
|---|---|---|---|
| EXPERIENCE | 5 | 4 | 4 |
| SKILLS | 4 | 4 | 3 |
| PROFESSIONALISM | 3 | 2 | 1 |
| RELEVANCE | 4 | 3 | 4 |

PHASED COLLABORATIVE EDITING

BACKGROUND OF THE INVENTION

Field of the Invention

The present invention relates in general to computing systems, and more particularly, to various embodiments for phased collaborative editing of a collaborative document by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information between people. For example, a group of users may desire to edit and author documents in a collaborative environment.

SUMMARY OF THE INVENTION

Various embodiments for phased collaborative editing by a processor are provided. In one embodiment, by way of example only, a method for phased collaborative editing of a collaborative document, again by a processor, is provided. A region tag of phased input may be assigned to one or more document regions of a collaborative document along with a list of users enabled to input data to the one or more document regions according to the region tag. A concealed region of the one or more document regions may be revealed to one or more users in the list of users upon content input by a user matching content of the concealed region.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a diagram illustrating an example of three separate displays of a document for rating and/or evaluating the potential employee candidate that is interviewing for a company in accordance with aspects of the present invention;

DETAILED DESCRIPTION OF THE DRAWINGS

Figure 1:
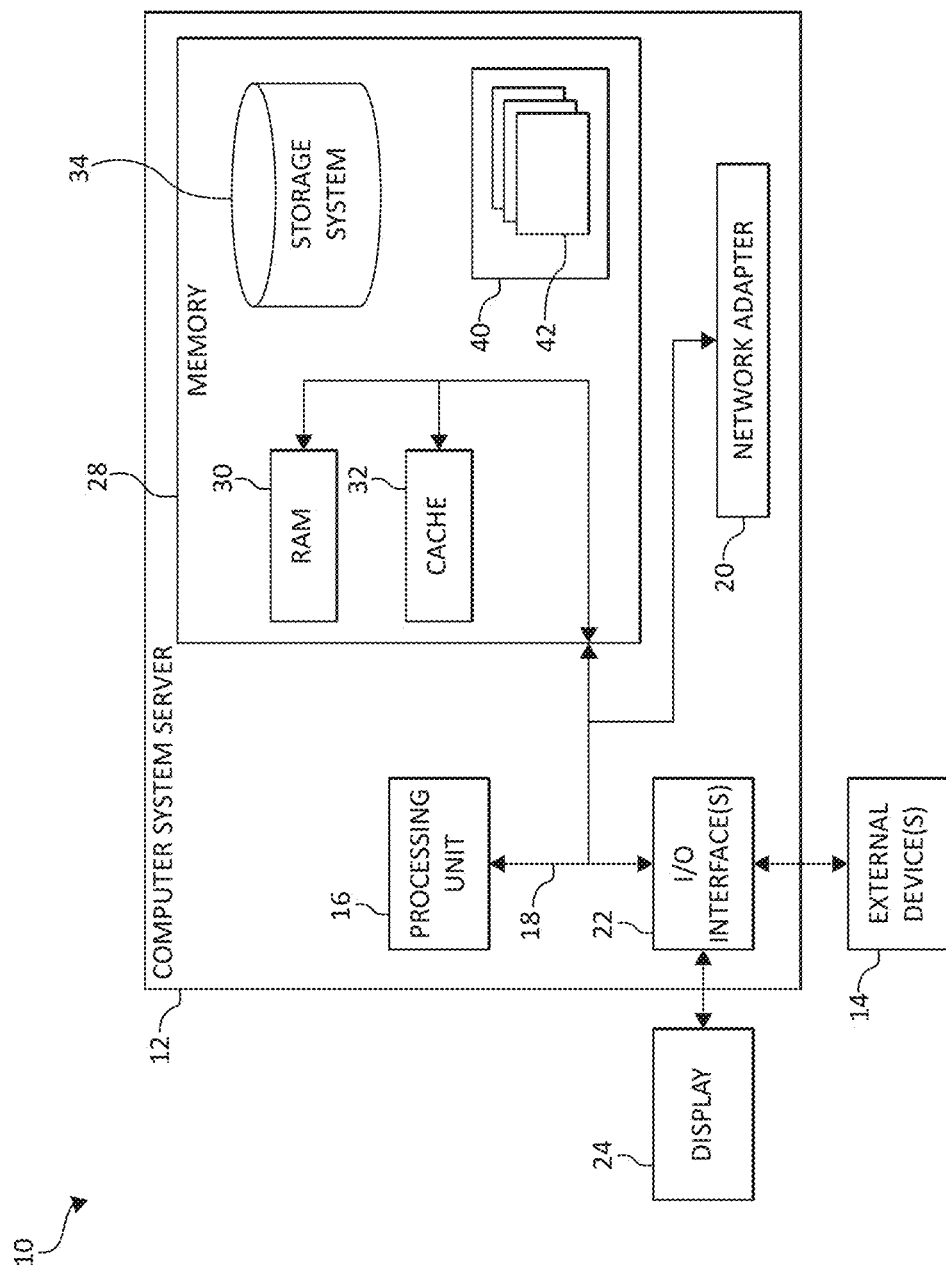
FIG. 1 is a block diagram depicting an exemplary cloud computing node according to an embodiment of the present invention.

With the advent of immediate, real-time communication made possible by smartphones and other devices, the proliferation of social media applications and other mechanisms having increased for people to use to share communication. Communications, such as emails, messages, speeches, social media posts, and other content may immediately become available in the public domain, and may remain in the public domain potentially indefinitely.

For content contributors, for example, the benefits of participating in social media have gone beyond simply social sharing, to building a person's reputation online, and bringing in career opportunities and monetary income. With the foregoing in mind, a user sharing communications, such as over social media, must consider the context of their communications and the implications of these communications. Along with the increased amount of, and ease of, communication has come negative implications in some scenarios, as individuals have lost jobs, others have faced defamation litigation, brands have dropped endorsements of celebrities due to public statements, messages, speeches, or posts, and other implications for sharing communications that were later interpreted as inappropriate.

While some applications, such as social media platforms, may contain functionality that performs a censorship role to eliminate offensive content in some situations, these mechanisms generally strictly use keywords to identify inappropriate communication, for example. However, the use of keywords and other simplistic approaches does not examine the context that the communications are provided. The "undesirable messages" are defined with a common yard stick, in the sense that the communications are interpreted in the same way, irrespective of who says what to whom and/or in what background. In some cases, well-worded communication may be considered proper, irrespective of who says what about what. The conventional approach, then, does not take into account the context of the instant communication.

The so-called "appropriateness" of communication, such as a message, may be very subjective and context dependent. The same message may be interpreted and evaluated to be either fine, or "totally improper," or even "illegal" depending on who (subject) says to whom (object), when and where (context). In some cases, lack of cultural and/or legal knowledge, or even insufficient linguistic and/or worldly knowledge on the part of the person authoring and/or sending communication may cause irreparable damage.

Consider the following example. A comment by an employee about his low opinion of a competing company's product may be appropriate in a private setting between the employee and another employee, such as in a private series of conversations posted inside the company's intranet. However, the same comments about the competitor may be deemed to be disparaging, and perhaps inappropriate, when publicly posted in a social media setting.

The foregoing example illustrates that the content of communication itself may not be inappropriate; rather the context of the communication becomes important as questions of to whom the communication is directed, who the communication is from, who may view the communication, where the communication is sent, and when the communication is sent.

It may be acceptable to post, for example, caricatures of a political figure in one country, but in another country, such caricatures may be a criminal offense. Politically sensitive communications may be acceptable in a personal social media page or through personal emails, but may be inappropriate if shared through company forums, conference calls, emails, or using other corporate resources.

Accordingly, the so-called "appropriateness" of a particular communication may depend greatly upon contextual factors, such as a subject-object relationship, and other contextual factors such as visibility of the message to other audiences/groups of people and current socially sensitive topics. A deeper, cognitive analysis of the communication is needed, for example based on standards, rules, and practices in ethical, moral, as well as legal dimensions.

The mechanisms of the illustrated embodiments help to facilitate communications in situations where certain communication may be inappropriate by employing a cognitive analysis using the context of the communication, in addition to other variables such as country specific laws, a rules system that may be adjusted towards attitude, emotion, machine learning/scoring rules, type of social network (public/private), the social reach/influence of the parties involved, topic of conversation, impact/potential viral spread of a post across social networks, and the like. When one or more of these contextual factors is determined to exceed a predetermined threshold of concern, the mechanisms then may alert the user should there be a potentially negative impact/implication to them. In addition, the mechanisms of the illustrated embodiments may also monitor reaction to communications so that weighting of contextual factors, derivation of certain rules, or other calculations may be tailored by the observed feedback.

It should be noted that reference to calculating an 'interpreted appropriateness" against a predetermined threshold herein following may refer to implementations of a wide variety of metric analysis, data analytics, and other data processing as one of ordinary skill in the art will appreciate. For example, a predetermined threshold may be set as a numerical value, where certain kinds of communication are given certain weighted values, and an aggregate number of the weighted values is compared against the numerical threshold value. In other embodiments, a "most significant" aspect of the communication may be selected, given a weight or other metric value, and compared against a bar metric representative of the threshold.

In one embodiment, for example, communications may be organized into certain intensity levels, where a benign form of communication is assigned a lower intensity value, and where potentially offensive, illegal, or other generally hazardous communication is assigned a high intensity value. Here again, the communications may be examined in view of the context in which the communication is made, so that some communication may be assigned a higher intensity value in a certain context. One of ordinary skill in the art, however, will appreciate that any number of metrics may be implemented as a "threshold" comparison to accomplish the various aspects of the illustrated embodiments.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
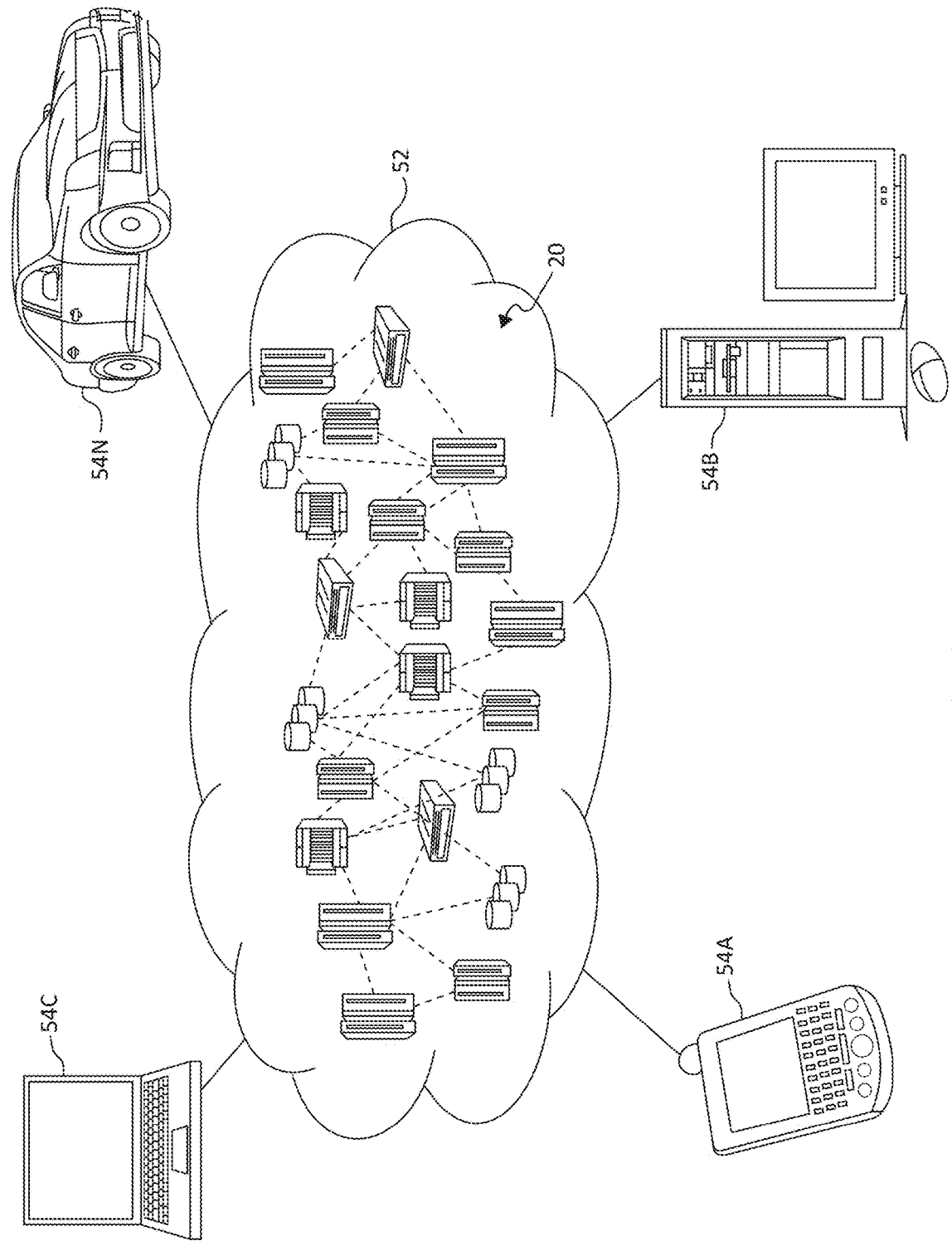
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
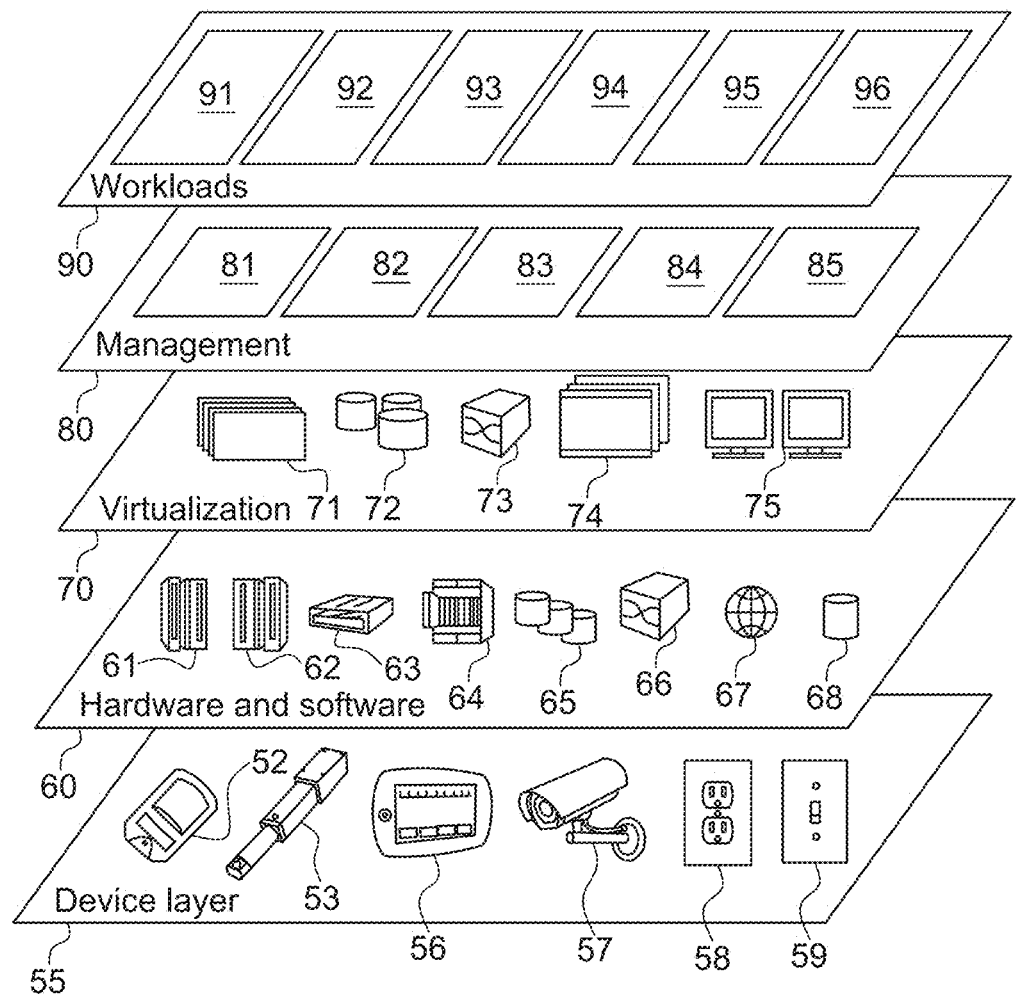
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various communication processing workloads and functions 96. In addition, communication processing workloads and functions 96 may include such operations as data analytics, data analysis, and as will be further described, notification functionality. One of ordinary skill in the art will appreciate that the communication processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for phased collaborative editing of a collaborative document. Document regions may be assigned a region tag of phased input and assigned a list of editors. A user may input/enter data content (e.g., text) to a specified area (e.g., interview feedback). A topic analysis operation may be performed on the text region which determines topic and key terms. The input text may be compared to alternative input text from one or more alternative users to determine if there is a match between both sets of text. If there is a match in the data content entered, text input is revealed for all parties. The determination of whether the sets of text match may be defined according to one of a plurality of rules, policies, or matching functions. For example, topics and keywords of the text may each, or collectively, be assigned a similarity score. If the similarity scores are within a defined range and/or equal to or greater than a similarity threshold score, the text input is revealed for all or a defined number of the users in the list of users.

In an additional aspect, an emotive lock may be provided whereby both topic and emotive content may be used to match and reveal document regions. Furthermore, one or more classifiers (e.g., Naive Bayes, support vector machine "SVM") may be used to compare graphical images. A loading bar or icon may also be used to display a user's "similarity" relative to the match. In an additional embodiment, a reversal operation may be performed whereby the input text is shown and/or displayed only if the texts are different. That is, a dissimilarity score may also be computed to determine the dissimilar text.

Thus, the present invention enables one or more regions of a document to be hidden and concealed within a collaborative document and allows the one or more regions to be hidden and concealed until a topic/emotive match has been determined.

Figure 4:
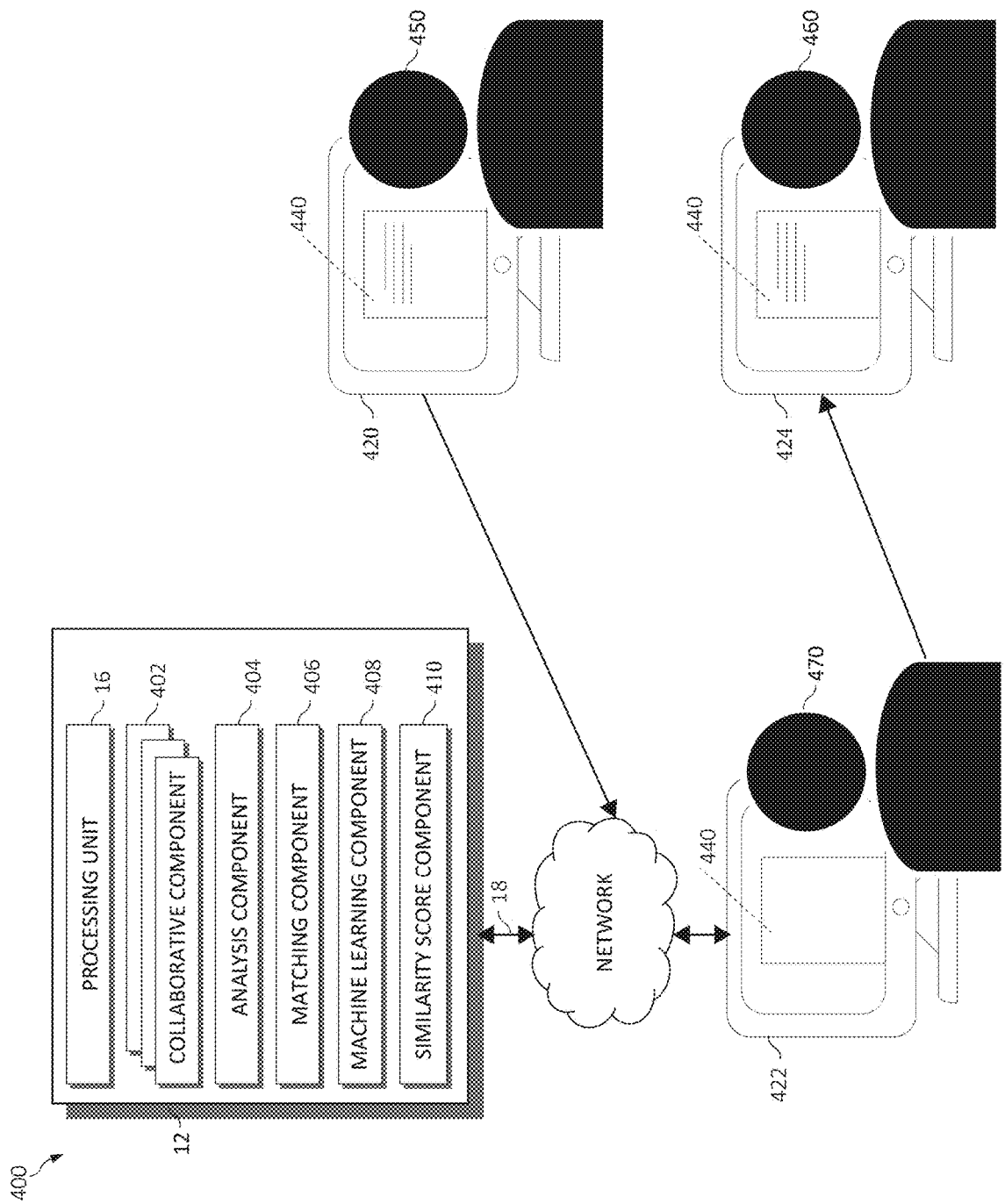
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. Computer system/server 12 is again shown, incorporating processing unit 16 to perform various computational, data processing and other functionality in accordance with various aspects of the present invention. As one of ordinary skill in the art will appreciate, the depiction of the various functional units in computer system/server 12 is for purposes of illustration, as the functional units may be located within computer system/server 12 or elsewhere within and/or between distributed computing components.

The computer system/server 12 may be in communication with one or more computing devices such as, for example, devices 420, 422, 424 and communicate as part of a collaborative communication environment. That is, the devices 420, 422, 424 may be connected to the computer system/server 12 through a network to the computer system/server 12 as shown.

The computer system/server 12 may include a collaborative component 402, an analysis component 404, a matching component 406, a machine learning component 408, and a similarity score component 410.

The collaborative component 402 may provide a collaborative environment for one or more users (e.g., editors) such as, for example, users 450, 460, 470 to engage and interact with a collaborative document 440. In one aspect, the collaborative document 440 may include, but is not limited to, one or more documents, materials related to emails, books, scientific papers, online journals, journals, articles, drafts, audio data, video data, and/or other various documents or data sources capable of being published, displayed, interpreted, transcribed, or reduced to text data. The collaborative component 402 may also be of different types such as, for example, word documents, wikis, web pages, power points, printable document format, or any document capable of being analyzed by a natural language processing system.

Each of the users 450, 460, 470 may be associated with the collaborative environment provided by computer system/server 12. The collaborative component 402 may assign a region tag of phased input to one or more document regions of the collaborative document 440 along with a list of users (e.g., users 450, 460, 470) enabled to input data to the one or more document regions according to the region tag. Each of the users may be assigned to the one or more document regions of the collaborative document 440 according to the assigned region tag. Additionally, in addition to assigning the region tags, the collaborative component 402 may associate each of the users 450, 460, 470 to the one or more document regions of the collaborative document 440 to the region tags according to one or more policies, rules, identification/authorization data, and/or other collaborative environment factors or parameters. For example, the collaborative environment may enable one or more of the users 450, 460, 470 to input, edit, modify, add to, delete from, and/or otherwise alter one or more regions according to the region tags of the collaborative document 440.

The analysis component 404 may work in concert with processing unit 16, and the machine learning component 408, to accomplish various aspects of the present invention. For example, the analysis component 404 may cognitively analyze the one or more document regions to determine or identify a topic, keywords, media data, or a combination thereof using one or more machine learning operations. The analysis component 404 may perform one or more data analytic operations and implement mathematical modeling, image processing, or other data processing technologies to carry out the various mechanisms of the illustrated embodiments.

In association with the analysis component 404, the machine learning component 408 may compare the input content of the user with input content of an alternative user for the one or more document regions. For example, as user 450 enters content into a selected region of the document 440, only user 450 is enabled to see the entered data. That is, as the user 450 enters the content in the selected region of the document 440, the entered content is concealed (in-real time) from users 460 and 470. However, the analysis component 404 and the machine learning component 408 may match the input content of user 450 with the input content of an alternative user such as, for example user 460 and/or 470 for the one or more document regions. The matching operation may include matching topics, keywords, images, or a combination thereof of the content input by the user with topics, keywords, images, or a combination thereof of the content input by an alternative user identified in the one or more document regions. In short, the analysis component 404 may perform topic analysis on a text region to determine topic and key terms and then compare the text inputted by two users to determine similarity between both sets of text and reveal the text input to all users.

In one aspect, for the comparing and matching, the analysis component 404 and the machine learning component 408 may use natural language processing (NLP) and artificial intelligence (AI) to provide processed, learned, and analyzed content. In one example, an instance of IBM® Watson® (IBM and Watson are trademarks of International Business Machines Corporation) NLP is used. The aspects of Watson that the described method and system makes use of are the technologies behind Alchemy Language (Alchemy Language is a trademark of International Business Machines Corporation). However, other NLP technologies or services may be used to provide the processed content as described herein, such as, for example, latent Dirichlet allocation (LDA) may be used.

Furthermore, the analysis component 404 and the machine learning component 408 may learn, analyze, and/or determine a logical understanding of how the original data in each of the document regions fit together in the document 440 using the power of the AI allowing for the comparing and matching of the concepts, topics, keyword, and images. In other words, the analysis component 404 and the machine learning component 408 may track, identify, and associate all data content inputs, communication threads, messages, transcripts, and the like of all data generated during all stages of the development or "life cycle" of the data content being entered, edited, modified, added to, deleted from, and/or otherwise altered in one or more regions according to the region tags of the collaborative document 440.

The similarity score component 410, working in conjunction with the analysis component 404 and the machine learning component 408, may assign a similarity score to the content input by the user according to the comparing. For example, the similarity score may be an assigned value, a value within a range of values, a percentage, an assigned rank, a maximum likelihood estimation ("MLE") score, and/or other defined score in relation to content being compared. For example, the input content of user 450 may be assigned an MLE score in relation to the input content of an alternative user such as, for example user 460 and/or 470 based on the comparison and matching. If the MLE score is equal to or greater than an MLE score threshold, the input content of user 450 may be revealed for display to an alternative user such as, for example, user 460 and/or 470 based on the comparison and matching. By way of example, as illustrated in FIG. 4, upon performing the comparison and matching operations, the input content of user 450 is only revealed for user 460 while the continuously being concealed from user 470.

In an additional aspect, the collaborative component 402 may also send an alert to one or more users in the list of users upon determining the input content of user 450 fails to match the input content of an alternative user such as, for example, user 470 for the one or more document regions.

In one aspect, devices 420, 422, 424 may include a user interface ("UI") (e.g., an interactive graphical user interface "GUI") providing user interaction with one or more users such as, for example, users 450, 460, and 470 for receiving one or more inputs/entries into one or more regions of document 440. Also, the devices 420, 422, 424 may be configured to receive one or more alerts as described herein.

It should be noted the machine learning component 408 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines ("SVM"), random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
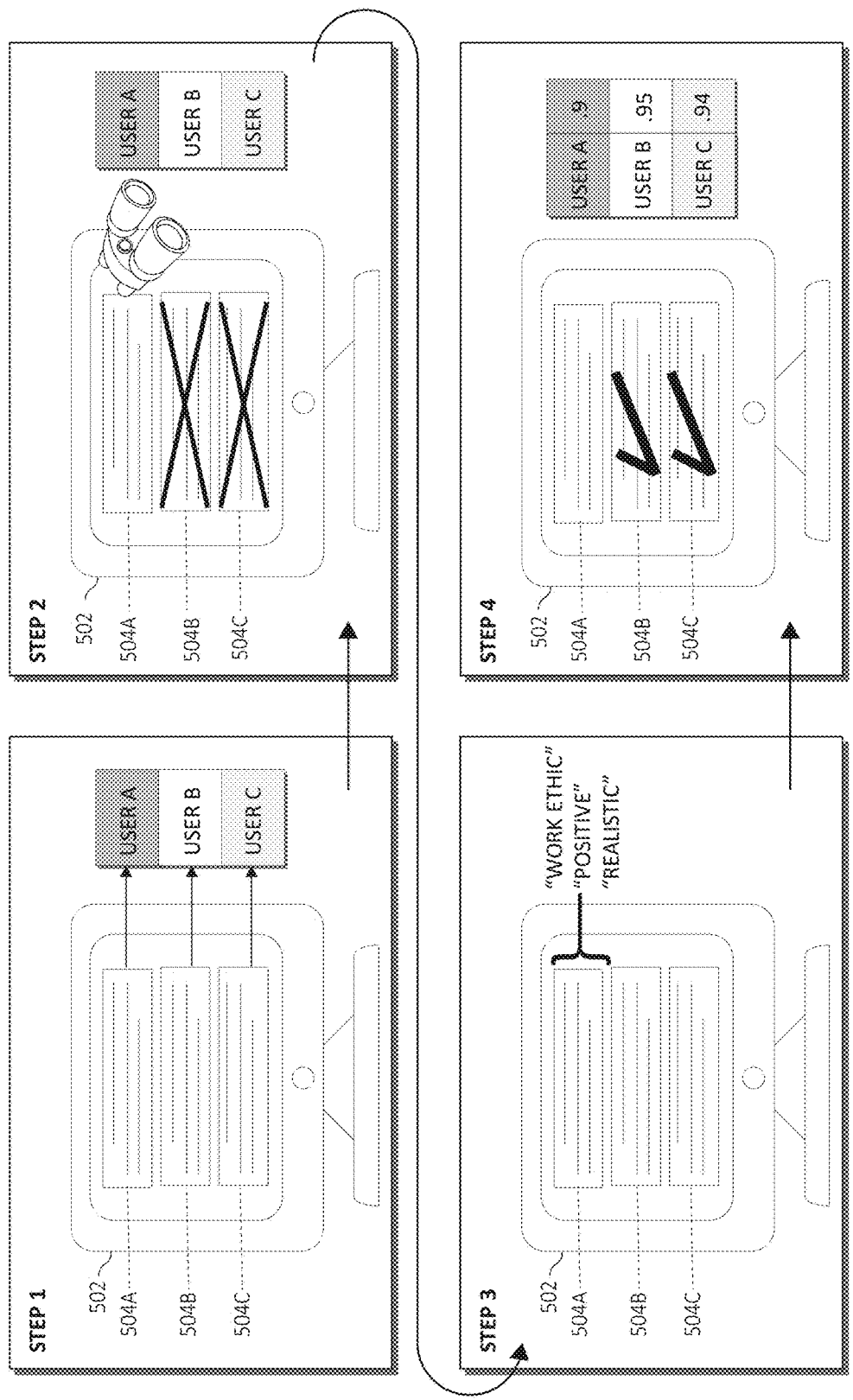
FIG. 5 is a block/flow diagram illustrating a collaborative document having one or more document regions in accordance with aspects of the present invention.

In view of the method 400 of FIG. 4, consider, as an illustration of exemplary functional blocks to accomplish various purposes of the present invention, FIG. 5, following. FIG. 5 illustrates these exemplary functional blocks 500 and associated notes on specific functionality (as denoted by the doted boxes). Each of the functional blocks 500 may be implemented in hardware and/or software, such as by the computer/server 12 (FIG. 1), and/or the workloads layer 90 (FIG. 3).

As depicted in FIG. 5, a block/flow diagram 500 depicts a collaborative document 502 having one or more document regions such as, for example, document regions 504A-504C. As illustrated in step 1, a region tag of phased input may be assigned to one or more document regions of a collaborative document along with a list of users enabled to input data to the one or more document regions according to the region tag. For example, "User A" may be assigned to document region 504A according to a region tag for document region 504A. "User B" may be assigned to document region 504B according to a region tag for document region 504B. "User C" may be assigned to document region 504C according to a region tag for document region 504C. Users A-C may be assigned as part of a list of editors.

In step 2, user A may input data content (e.g., text) to a document region 504A (e.g., interview feedback). The input data content entered by user A is visible and/or displayed only to user A in the collaborative document 502. At this point, user B and user C are unable to observe or see the input data content entered by user A (as illustrated by the "X" on document regions 504B and 504C for illustrative convenience). A topic analysis may be performed on the document region 504A and may determine topic, key terms, and/or images using a machine learning operation (e.g., NLP or AI).

In step 3, user B inputs text content to a specified area (e.g., interview feedback) such as, for example, document region 504B and this text is then visible only by user B. Again, a topic analysis may be performed on the document region 504B and may determine topic, key terms, and/or images using a machine learning operation (e.g., NLP or AI). For example, the topic, key terms, and/or images may be "work ethic," "positive," and/or "realistic" for document region 504B. A comparison operation may be performed on the input data content entered by user A as compared to input data content provided by user B in document region 504B and user C in document region 504C. A matching operation may determine a matching score that may be an assigned value, rank, percentage, or MLE score using one or more operations (e.g., an MLE score operation, a signed rank test, etc.).

In step 4, if there is a match between the entered content, the inputted/entered content (e.g., of user A and/or user B) may be revealed to each of the users in the list of users (e.g., users A-C). For example, if the matching score is within the defined range, a ranking, percentage, a signed rank test, and/or a defined matching score threshold, the newly entered data may be displayed to alternative users. For example, assume that a matching score threshold is set at 0.8. For the input data content entered by user A, an MLE score may be determined, for example, as 0.9. For the input data content entered by user B, an MLE score may be determined, for example, as 0.95. For the input data content entered by user C, an MLE score may be determined, for example, as 0.94. Accordingly, the input data content entered by user A may be revealed to both user A and/or user C. This is because the MLE scores for each user is above the matching score threshold. Moreover, the user of the MLE score itself may be analyzed and defined for revealing the input data content to other users in the list of users. It should be noted that if there is no content match, both document editors such as, for example, user A and user B receive a notification to alert users of the non-matching content.

Turning now to FIG. 6, a block diagram illustrates an example of phased collaborative editing of a collaborative document for evaluating a potential employee candidate. Also, one or more aspects of FIGS. 1-5 may also be included with and/or implemented with FIG. 6.

FIG. 6 illustrates three separate displays (e.g., document display 602A-602C) of a document for rating and/or evaluating the potential employee candidate that is interviewing for a company. As depicted, a document may be a rating spreadsheet that may be hosted in a cloud environment, as described herein, and can be edited by all users such as, for example, user A, user B, and user C. The document display 602A may be a master view in real time. The document display 602B may be user B's view of the collaborative document prior to entering data content. The document display 602C may be user B's view of the collaborative document after entering data content.

For example, as depicted in the master view (in real time) document display 602A, user A and user C enter data into one or more regions of the collaborative document (according to an assigned region tag). To prevent any bias or undue influence on user B, a collaborative document system may withhold user A and user C inputs until user B inputs data (e.g., a candidate rating) into the collaborative document for the potential employee candidate, as depicted in document display 602B (e.g., user B's view prior to rating). This ensures that user B's inputs are not influenced by user A and user C. One or more data validation operations may be used to ensure that user B is inputting relevant data (e.g., defined or mandatory type data such as a "ranking score") and not merely textual place holders to view what user A and user C have entered. Also, a comparison and/or matching operation may be performed to determine if the data content entered by user B matches the data content of users A and C. Upon determining the data content entered by user B matches the data content of user A and C, the data content of user A and C is now displayed for user B as illustrated in document display 602C. Thus, as stated above, document display 602C may be user B's view of the collaborative document after entering data content.

Figure 7:
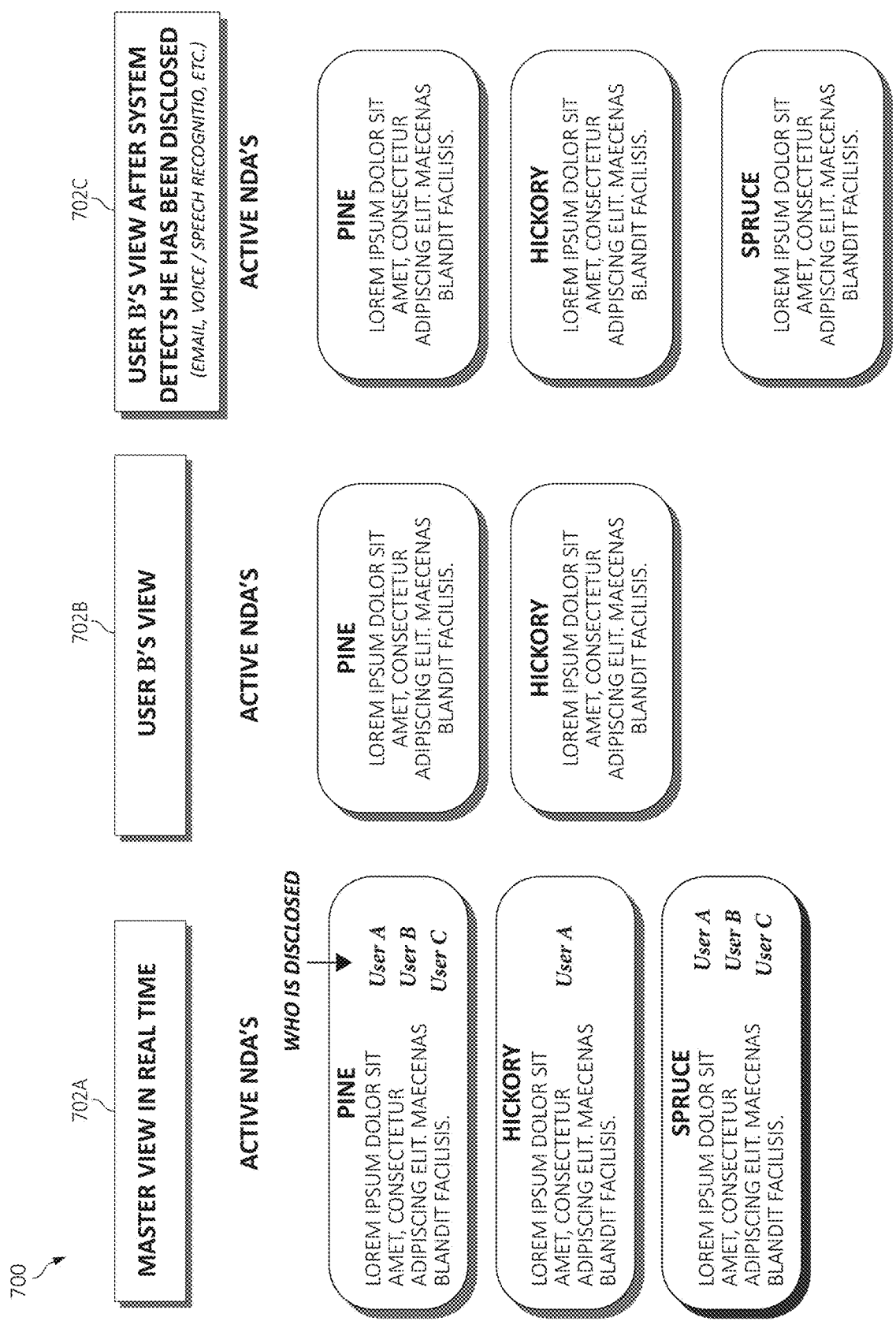
FIG. 7 is a diagram illustrating an example of three separate displays of a document for maintaining a list of active non-disclosure agreements ("NDA") by a manager of an organization in accordance with aspects of the present invention.

Turning now to FIG. 7, an additional example that illustrates three separate displays (e.g., document display 702A-702C) of a document for maintaining a list of active non-disclosure agreements ("NDA") by a manager or leader of an organization is provided. Also, one or more aspects of FIGS. 1-5 may also be included with and/or implemented with FIG. 7.

As depicted, a document may be a list of active NDAs that may be hosted in a cloud environment, as described herein. However, the view (e.g., document displays 702A-702C) of the document may appear differently with respect to the viewing user. That is, the display of the document may be unique to each user. The visibility of the document may be expanded based on an emotive or topic that may be sourced from a magnitude of source.

For example, the document display 702A may be a master view in real time. By way of example only, the document illustrates several document regions with each region being associated with users that have been disclosed for viewing those particular document regions (e.g., "pine," "hickory," and "spruce").

The document display 702B may be user B's view of the collaborative document prior to detecting that user B is disclosed (e.g., email, voice/speech recognition, etc.) for an active NDA (e.g., "spruce" NDA is not detected in document display 702B). Once user B's view of the collaborative document is detected as being disclosed (e.g., email, voice/speech recognition, etc.) for the active NDA (e.g., "spruce" NDA is now detected), the detected, active NDA may be disclosed to the user. That is, document display 702C may be user B's view of the collaborative document after the user has been detected as being disclosed (e.g., email, voice/speech recognition, etc.) for active NDA "spruce." That is, user B's visibility of the document is expanded based on an emotive or topic sourced from a magnitude of sources.

Figure 8:
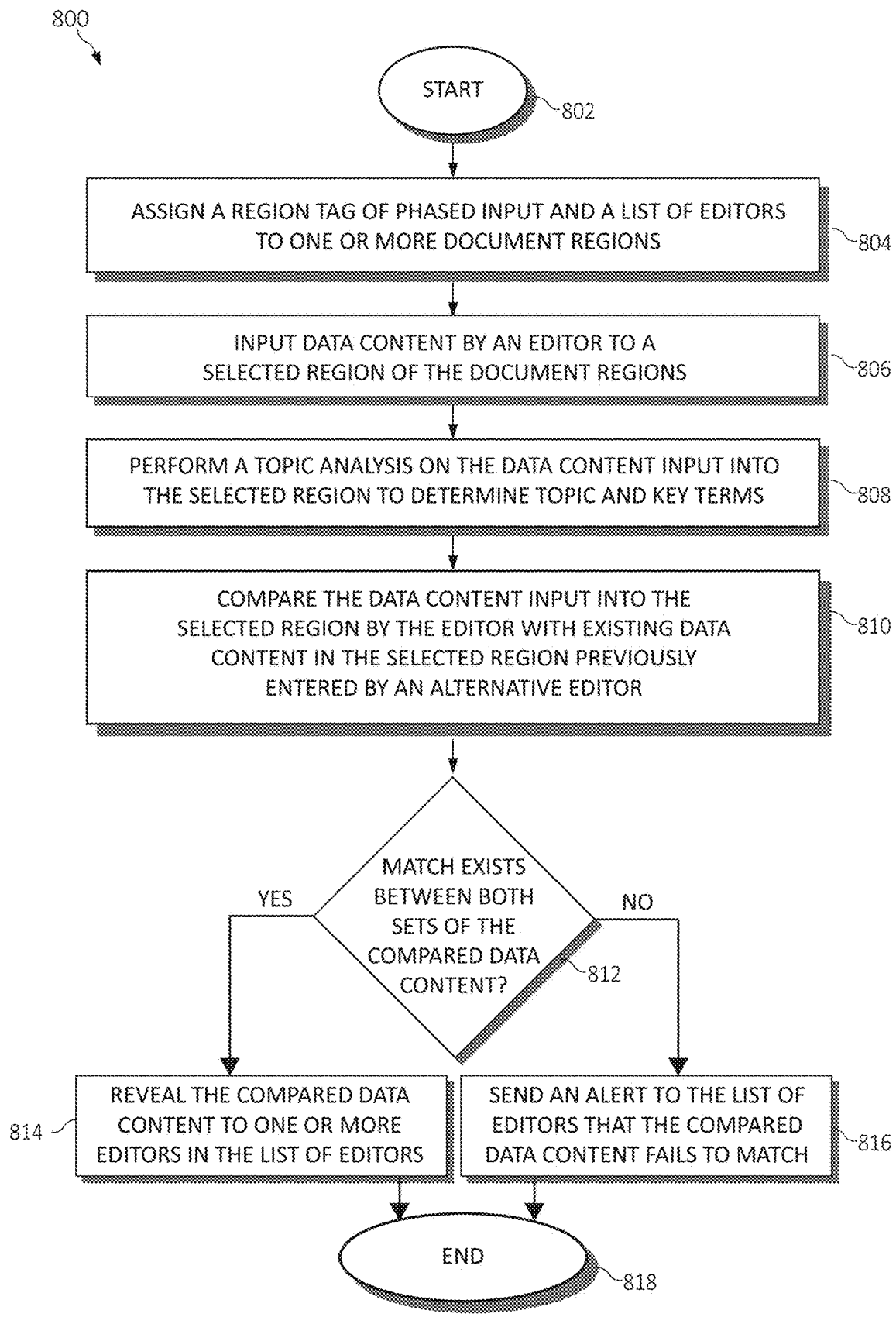
FIG. 8 is an additional flowchart diagram of an exemplary method for phased collaborative editing of a collaborative document in a computing environment in accordance with aspects of the present invention.

FIG. 8 is an additional flowchart diagram of an exemplary method for phased collaborative editing of a collaborative document in a computing environment. The blocks of functionality 800 may also be incorporated into various hardware and software components of FIGS. 1-5. The functionality 800 may be implemented as a method executed as instructions on a machine, where the instructions are included on at least one computer readable medium or one non-transitory machine-readable storage medium.

The functionality 800 may start in block 802. A region tag of phased input and a list of editors may be assigned to one or more document regions, as in block 804. Data content may be input/entered by an editor to a selected region of the document regions, as in block 806. A topic analysis may be performed on the data content input/entered into the selected region to determine topic and key terms, as in block 808. The data content input/entered into the selected region by the editor may be compared with existing data content in the selected region previously input/entered by an alternative editor, as in block 810. A determination operation may be performed to determine if a match (e.g., matching text, topics, keywords, and/or media data such as graphical images, etc.) exists between both sets of the compared data content, as in block 812. If the set of the compared data content matches, the compared data content may be revealed to one or more editors in the list of editors (which may include both editors of the compared data content), as in block 814. If a match does not exist, an alert may be sent to the list of editors that the compared data content fails to match, as in block 816. The functionality 800 may end in block 818.

Figure 9:
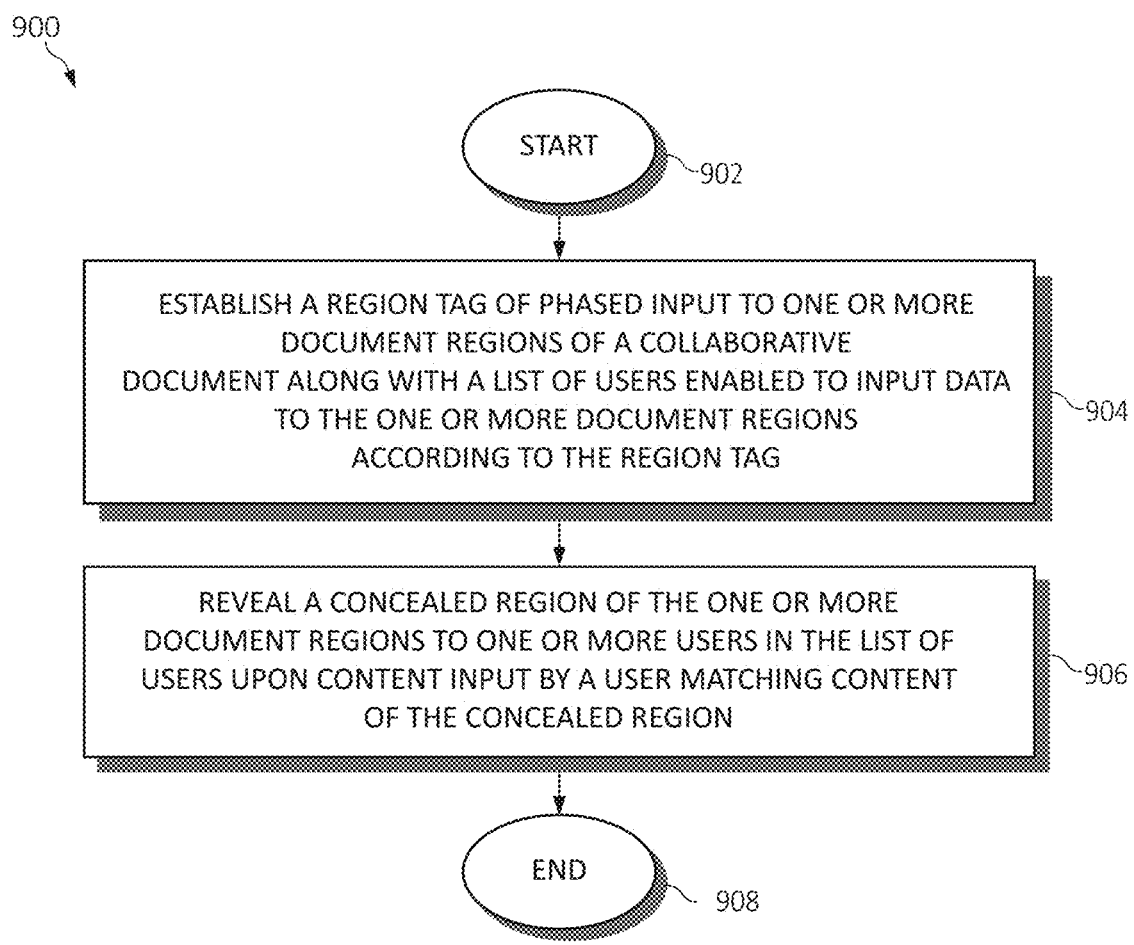
FIG. 9 is an additional flowchart diagram of an exemplary method for phased collaborative editing of a collaborative document in a computing environment in accordance with aspects of the present invention.

FIG. 9 is an additional flowchart diagram of an exemplary method for phased collaborative editing of a collaborative document in a computing environment. The blocks of functionality 900 may also be incorporated into various hardware and software components of FIGS. 1-5. The functionality 900 may be implemented as a method executed as instructions on a machine, where the instructions are included on at least one computer readable medium or one non-transitory machine-readable storage medium.

The functionality 900 may start in block 902. A region tag of phased input may be assigned to one or more document regions of a collaborative document along with a list of users enabled to input data to the one or more document regions according to the region tag, as in block 904. A concealed region of the one or more document regions may be revealed to one or more users in the list of users upon content input by a user matching content of the concealed region, as in block 906. The functionality 900 may end in block 908.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for phased collaborative editing by a processor, comprising:
   assigning a region tag of phased input to one or more document regions of a collaborative document along with a list of users enabled to input data collaboratively in real-time to the one or more document regions according to the region tag; and
   revealing an intentionally concealed region of the one or more document regions to one or more users in the list of users upon content input by a user matching content of the concealed region, wherein a validation operation is performed to ensure the content input by the user comprises relevant data with respect to the content of the concealed region of the collaborative document prior to revealing the concealed portion, and wherein the validation operation includes using an emotive lock whereby both topic and emotive content of the content input by the user is compared to the content of the concealed region to perform the matching such that, when the content input by the user comprises textual placeholders being non-relevant to the content of the concealed region, the emotive lock is maintained and the concealed region remains concealed.

2. The method of claim 1, further including cognitively analyzing the one or more document regions to determine or identify a topic, keywords, media data, or a combination thereof using one or more machine learning operations.

3. The method of claim 1, further including comparing the input content of the user with input content of an alternative user for the one or more document regions.

4. The method of claim 1, further including assigning a similarity score to the content input by the user according to the comparing.

5. The method of claim 1, further including matching the input content of the user with input content of an alternative user for the one or more document regions.

6. The method of claim 1, further including matching topics, keywords, images, or a combination thereof of the content input by the user with topics, keywords, images, or a combination thereof of content input by an alternative user identified in the one or more document regions.

7. The method of claim 1, further including alerting one or more users in the list of users of the input content of the user failing to match input content of an alternative user for the one or more document regions.

8. A system for phased collaborative editing, comprising:
   one or more computers with executable instructions that when executed cause the system to:
      assign a region tag of phased input to one or more document regions of a collaborative document along with a list of users enabled to input data collaboratively in real-time to the one or more document regions according to the region tag; and
      reveal an intentionally concealed region of the one or more document regions to one or more users in the list of users upon content input by a user matching content of the concealed region, wherein a validation operation is performed to ensure the content input by the user comprises relevant data with respect to the content of the concealed region of the collaborative document prior to revealing the concealed portion, and wherein the validation operation includes using an emotive lock whereby both topic and emotive content of the content input by the user is compared to the content of the concealed region to perform the matching such that, when the content input by the user comprises textual placeholders being non-relevant to the content of the concealed region, the emotive lock is maintained and the concealed region remains concealed.

9. The system of claim 8, wherein the executable instructions further cognitively analyze the one or more document regions to determine or identify a topic, keywords, media data, or a combination thereof using one or more machine learning operations.

10. The system of claim 8, wherein the executable instructions further compare the input content of the user with input content of an alternative user for the one or more document regions.

11. The system of claim 8, wherein the executable instructions further assign a similarity score to the content input by the user according to the comparing.

12. The system of claim 8, wherein the executable instructions further match the input content of the user with the input content of an alternative user for the one or more document regions.

13. The system of claim 8, wherein the executable instructions further match topics, keywords, images, or a combination thereof of the content input by the user with topics, keywords, images, or a combination thereof of content input by an alternative user identified in the one or more document regions.

14. The system of claim 8, wherein the executable instructions further alert one or more users in the list of users of the input content of the user failing to match input content of an alternative user for the one or more document regions.

15. A computer program product for phased collaborative editing by a processor, the computer program product comprising a non-transitory computer-readable storage medium having computer-readable program code portions stored therein, the computer-readable program code portions comprising:
   an executable portion that assign a region tag of phased input to one or more document regions of a collaborative document along with a list of users enabled to input data collaboratively in real-time to the one or more document regions according to the region tag; and
   an executable portion that reveals an intentionally concealed region of the one or more document regions to one or more users in the list of users upon content input by a user matching content of the concealed region, wherein a validation operation is performed to ensure the content input by the user comprises relevant data with respect to the content of the concealed region of the collaborative document prior to revealing the concealed portion, and wherein the validation operation includes using an emotive lock whereby both topic and emotive content of the content input by the user is compared to the content of the concealed region to perform the matching such that, when the content input by the user comprises textual placeholders being non-relevant to the content of the concealed region, the emotive lock is maintained and the concealed region remains concealed.

16. The computer program product of claim 15, further including an executable portion that cognitively analyzes the one or more document regions to determine or identify a topic, keywords, media data, or a combination thereof using one or more machine learning operations.

17. The computer program product of claim 15, further including an executable portion that compares the input content of the user with input content of an alternative user for the one or more document regions.

18. The computer program product of claim 15, further including an executable portion that assigns a similarity score to the content input by the user according to the comparing.

19. The computer program product of claim 15, further including an executable portion that:
   matches the input content of the user with input content of an alternative user for the one or more document regions; or
   matches topics, keywords, images, or a combination thereof of the content input by the user with topics, keywords, images, or a combination thereof of content input by an alternative user identified in the one or more document regions.

20. The computer program product of claim 15, further including an executable portion that alerts one or more users in the list of users of the input content of the user failing to match input content of an alternative user for the one or more document regions.

* * * * *